Jan. 14, 1958　　　F. BISCEGLIE　　　2,819,766
AUTOMOBILE PARKING DEVICE
Filed Oct. 5, 1953　　　　　　　　　　　　　4 Sheets-Sheet 1

INVENTOR.
FRANK BISCEGLIE
BY
ATTORNEY

Jan. 14, 1958    F. BISCEGLIE    2,819,766
AUTOMOBILE PARKING DEVICE
Filed Oct. 5, 1953    4 Sheets-Sheet 2
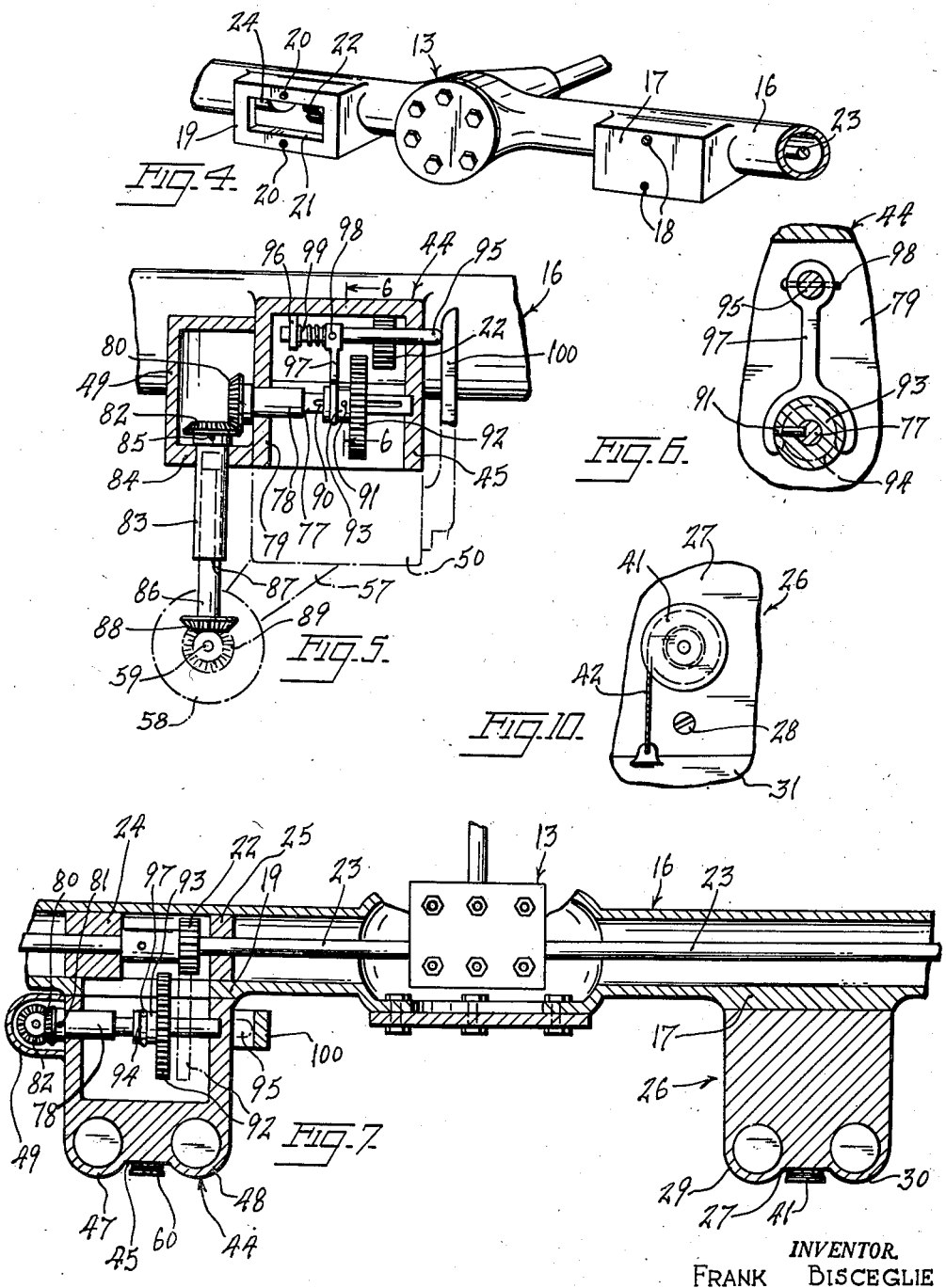
INVENTOR.
FRANK BISCEGLIE
BY
ATTORNEY Jan. 14, 1958   F. BISCEGLIE   2,819,766
AUTOMOBILE PARKING DEVICE Filed Oct. 5, 1953   4 Sheets-Sheet 3

INVENTOR.
FRANK BISCEGLIE
BY
ATTORNEY

Jan. 14, 1958  F. BISCEGLIE  2,819,766
AUTOMOBILE PARKING DEVICE
Filed Oct. 5, 1953  4 Sheets-Sheet 4
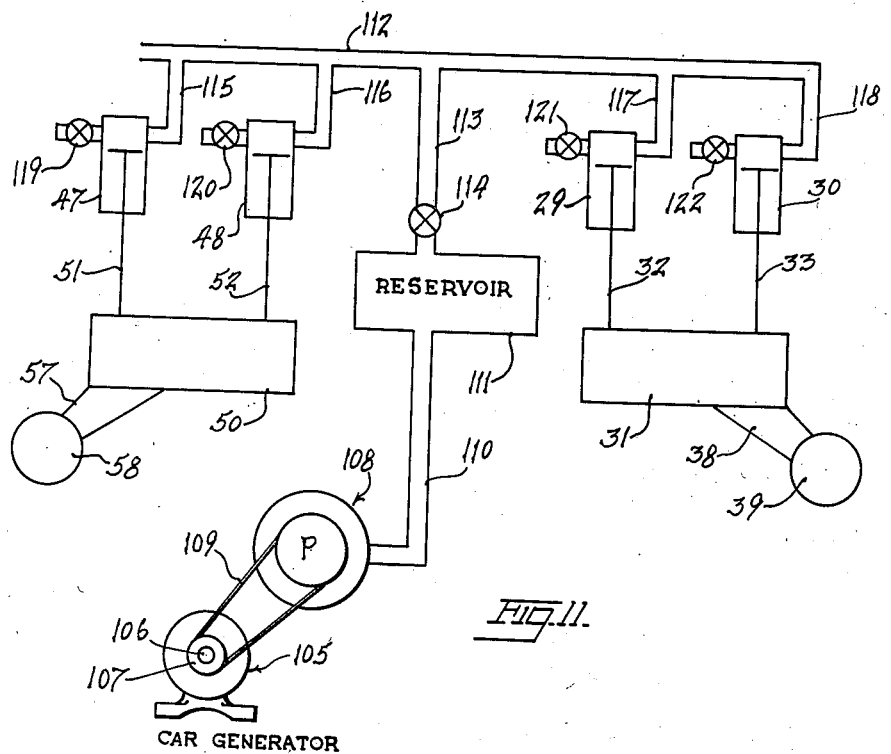
INVENTOR
FRANK BISCEGLIE
BY
ATTORNEY United States Patent Office 2,819,766
Patented Jan. 14, 1958

2,819,766

AUTOMOBILE PARKING DEVICE

Frank Bisceglie, New York, N. Y.

Application October 5, 1953, Serial No. 384,251

2 Claims. (Cl. 180—1)

This invention relates to automobile parking devices.

It is an object of the present invention to provide an automobile parking device wherein auxiliary wheels disposed at right angles to the regular wheels may be lowered at the rear portion of the car, these auxiliary wheels being rotated slowly to move the rear end of the car toward the curb after the front of the car has been parked in the usual manner.

It is another object of the present invention to provide an automobile parking device wherein the front of the car is parked in the usual manner with the steering wheel and wherein the parking device is brought into operation by lowering auxiliary wheels at the rear of the car for moving the latter inwardly against the curb.

It is another object of the present invention to provide a parking device for automobiles which is particularly adapted for parking in limited spaces, or parking spaces which are otherwise impossible to employ.

Other objects of the present invention are to provide a parking device for automobiles which is of simple construction, inexpensive to manufacture, may be readily mounted on conventional automobiles, has a minimum number of parts, is easy to use and efficient in operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a view similar to Fig. 3 showing the rear axle before attachment of the invention thereto.

Fig. 5 is a vertical sectional view taken along the line 5—5 of Fig. 3.

Fig. 6 is a vertical sectional view taken along the line 6—6 of Fig. 5.

Fig. 7 is a transverse sectional view taken along the line 7—7 of Fig. 3.

Fig. 10 is an enlarged front elevational view of the spring means for retracting the device to an inoperative position.

Fig. 11 is a schematic diagram of a modified form of the present invention.

Figure 3:
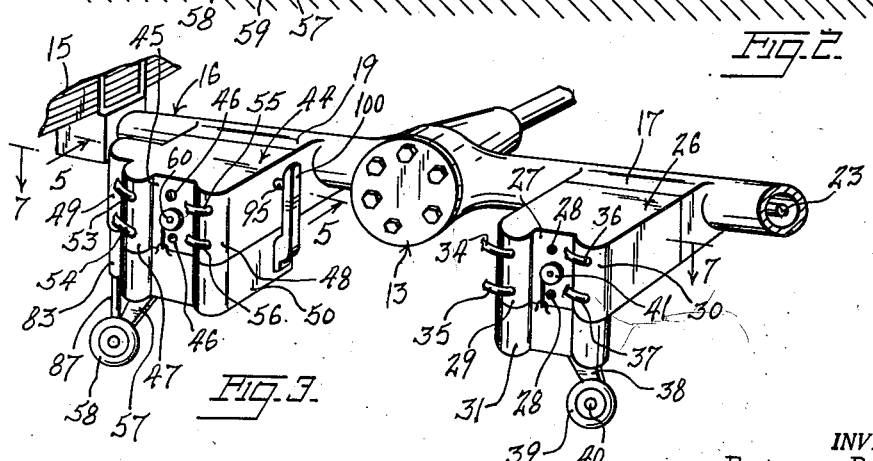
Fig. 3 is a fragmentary rear perspective view of the car body showing the device mounted thereon.

Referring now to the figures, 10 represents an automobile having a body 11 mounted on the usual chassis 12 and including a standard type differential 13 which drives the rear wheels 14, in the usual manner of automobile constructions. The usual springs 15 are provided across the rear axle construction 16 whereby to support the chassis 12 (Fig. 3).

In the practice of my invention, the axle construction 16 on one side of the differential 13 is provided with a mounting casing 17 having a pair of vertically spaced, internally threaded mounting openings 18, the axle construction 16 on the other side of differential 13 being provided with a second housing 19 having a pair of vertically spaced, internally threaded mounting openings 20. It will be noted that the casing 19 is provided with an opening 21.

A gear 22 is keyed onto one of the usual axle shafts 23 forwardly of the opening 21, bushings 24 and 25 (Fig. 7) being provided on axle 23 on either side of the gear 22 whereby to prevent distortion of the axle 23 when the gear 22 is in mesh, in a manner to be hereinafter described.

A hydraulic jack 26 including an upper housing 27 is secured to the casing 17 by means of bolts 28, the housing 27 being provided with a pair of hollow cylindrical portions 29 and 30. The hydraulic jack 26 also includes a bottom portion 31 having secured thereto a pair of piston rods 32 and 33, the piston rods 32 and 33 extending upwardly within the cylindrical portions 29 and 30 and being provided with suitable pistons therewithin, not shown. The cylindrical portion 29 is provided with a reversible inlet 34 and outlet 35 while the cylindrical portion 30 is also provided with a reversible inlet 36 and outlet 37, the inlets 34, 36 and the outlets 35, 37 being located on opposite sides of the pistons, as will be obvious. The lower portion 31 is provided with a bracket 38 which rotatably mounts an auxiliary wheel 39 by means of axle 40. The lower portion 31 is normally retained in the raised position by means of a spring drum 41 mounted on the outside of upper housing 27 and connected to the lower portion 31 by means of a cable 42 (Fig. 10). Thus, as the lower portion 31 is forced downwardly the spring drum 41 will be unreeled. Upon release of the lower member 31, the spring drum 41 will retract the former.

A second hydraulic jack 44 including an upper housing 45 is mounted on casing 19 by means of bolts 46 received within the openings 20, the upper portion 45 being hollow and provided with cylindrical portions 47 and 48 as well as a side extension 49. The hydraulic jack 44 also includes a lower portion 50 fixedly carrying a pair of piston rods 51 and 52 received upwardly within the hollow cylindrical portions 47 and 48 and provided therewithin with pistons, not shown, in a manner similar to the jack 26. Reversible inlet 53 and outlet 54 are provided in cylindrical portion 47 while a reversible inlet 55 and outlet 56 are provided in cylindrical portion 48, the inlets 53, 55 and outlets 54, 56 being located on opposite sides of the pistons. An offset bracket 57 extends downwardly from the lower portion 50 and rotatably mounts an auxiliary wheel 58 below extension 49 by means of a shaft 59.

As a means of retaining the lower portion 50 in a retracted position, a spring drum 60 is rotatably mounted (Fig. 2) on the upper housing 45 and winds a cable 61 connected at its free end to the lower portion 50, the drum 60 operating to retract lower portion 50 in a manner similar to the spring drum 41.

Figure 2:
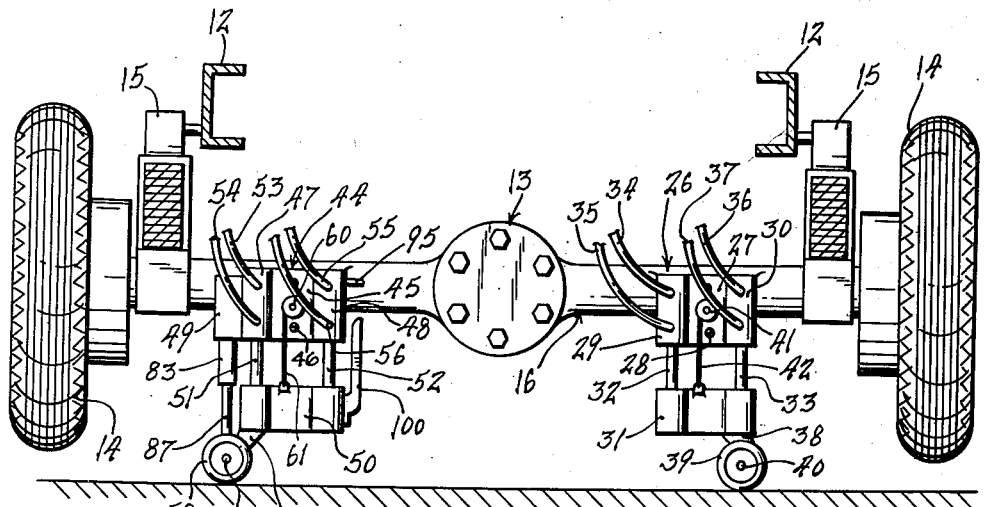
Fig. 2 is a vertical sectional view taken along the line 2—2 of Fig. 1, on an enlarged scale.
Figure 8:
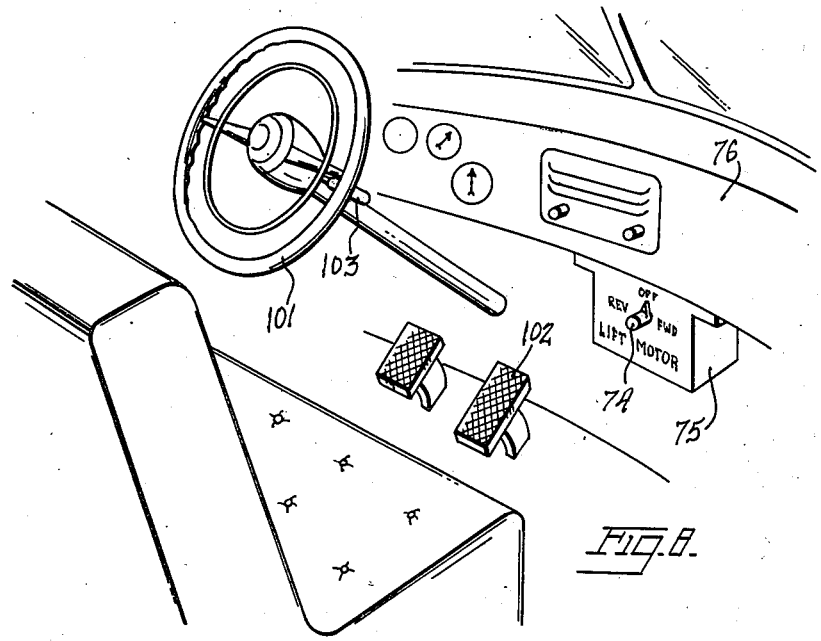
Fig. 8 is a perspective view of the dashboard of the car and showing the parking device control mounted therebelow.
Figure 9:
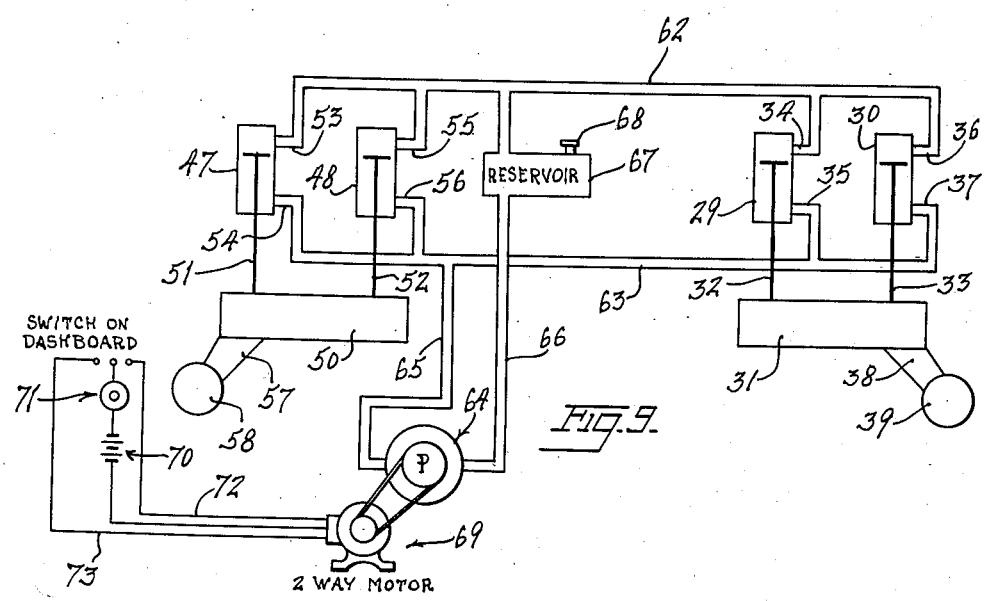
Fig. 9 is a schematic diagram of the device.

In Fig. 9 is shown a fluid filled system in which the inlets 53, 55, 34 and 36 are connected to a line 62 while the outlets 54, 56, 35 and 37 are connected to a second line 63, the line 63 being connected to a reversible pump 64 by means of a line 65 while the line 62 is likewise connected to the reversible pump 64 by means of a line 66. A reservoir 67 is provided in line 66 and contains an inlet 68. The pump 64 is driven by a two-way motor 69, the motor 69 having its central terminal connected to a source of voltage 70, the two other terminals of motor 69 being connected to a three-way switch 71 by means of wires 72 and 73. The switch 71 includes an external knob 74 (Fig. 8) mounted in the outer face of casing 75 mounted below dashboard 76, the casing 75 being provided with suitable markings to indicate whether the motor 69 is off or operating to raise or lower the wheels 58 and 39. Thus, when it is desired to lower the wheels 58 and 39, the dial 74 will be rotated to the "Forward" position (Fig. 8) whereupon the hydraulic fluid from reservoir 67 will be pumped into inlets 53, 55, 34 and 36 to force the piston rods 51, 52, 33 and 32 downwardly against the action of the drums 60 and 41, and to raise the wheels 14 above the ground (Fig. 2). When it is desired to raise the auxiliary wheels 58 and 39, the knob 74 will be rotated to the "reverse" position (Fig. 8), whereby the hydraulic fluid will be reversibly pumped from reservoir 67 into the outlets 54, 56, 35 and 37, to retract the auxiliary wheels with the aid of the drums 60 and 41.

As a means of driving the wheel 58 from the main drive of the vehicle, a shaft 77 is rotatably mounted within the upper housing 45 in front of the opening 21 and gear 22, one end of shaft 77 being journalled in the inner end wall of upper housing 45 (Fig. 5) while the other end is enlarged as at 78 and is rotatably mounted in the partition 79 separating extension 49 from the housing 45 proper. A bevel gear 80 is keyed on to the shaft 78 by means of a screw 81, the bevel gear 80 being in mesh with a bevel gear 82 keyed on to a hollow vertical shaft 83 rotatably mounted in the partition 84 of extension 49, the bevel gear 82 being keyed on to the shaft 83 by means of a set screw 85. The hollow shaft 83 extends downwardly through the bottom of extension 49 and telescopically receives upwardly therewithin a shaft 86, the shaft 86 being provided with an elongated keyway 87 cooperating with a key, not shown, within the hollow shaft 83. A bevel gear 88 is keyed onto the bottom of shaft 86 and is in mesh with a bevel gear 89 keyed on to the shaft 59. Thus, upon rotation of shafts 77, 78 and bevel gear 80, the shaft 83 will be rotated to rotate the bevel gear 88 and thereby the wheel 58. The telescopic shafts 83, 86 will permit the lowering of wheel 58 without disconnecting the drive, as will be obvious.

As a means of driving the shaft 77, 78, the shaft 77 is provided with an elongated keyway 90 which receives a key 91 provided in a gear 92, the gear 92 being adapted to mesh with the gear 22 when aligned longitudinally with the latter. The hub 93 of gear 92 is provided with an annular groove 94 for a purpose which will hereinafter become clear.

A shaft 95 is slidably journalled in the inner end wall of upper housing 45 at one end, the other end of the shaft 95 being slidably rotatably mounted in a bearing member 96 integrally formed in the top wall (Fig. 5) of housing 45. A bifurcated member 97 is keyed to the shaft 95 by means of a pin 98 and straddles the groove 94 whereby to move the gear 92 along shaft 77 when shaft 95 is moved axially. An expansion spring 99 sleeves the shaft 95 intermediate bearing member 96 and bifurcated member 97 whereby to normally urge the shaft 95 outwardly, and the gear 92 into mesh with the gear 22.

As a means of retaining the gear 92 out of mesh with the gear 22 when the auxiliary wheels are in an inoperative position, the lower portion 50 on its inner end is provided with a cam 100 which forces the shaft 95 inwardly against the action of spring 99 when the wheels are retracted upwardly. However, when the wheels are lowered by means of the knob 74, the cam 100 will be lowered with the lower portion 50 to automatically permit the gear 92 to move into mesh with the gear 22 under the action of expansion spring 99. Thus, the wheel 58 will be driven by the same drive as the rear wheels of the car 14, these latter wheels rotating harmlessly in a raised inoperative position when the auxiliary wheels are lowered (Fig. 2). When it is desired to rotate the car inwardly against the curb in the direction of the arrow B (Fig. 1) after the car has been driven into position along the direction of the arrow A by means of the steering wheel 101, gas pedal 102 will be employed along with the steering wheel shift 103. When it is desired to reverse the direction of the arrow B of Fig. 1 and unpark the car, the shift 103 will be put into reverse to rotate the wheel 58 in the opposite direction, the wheel 39 following at all times.

Figure 1:
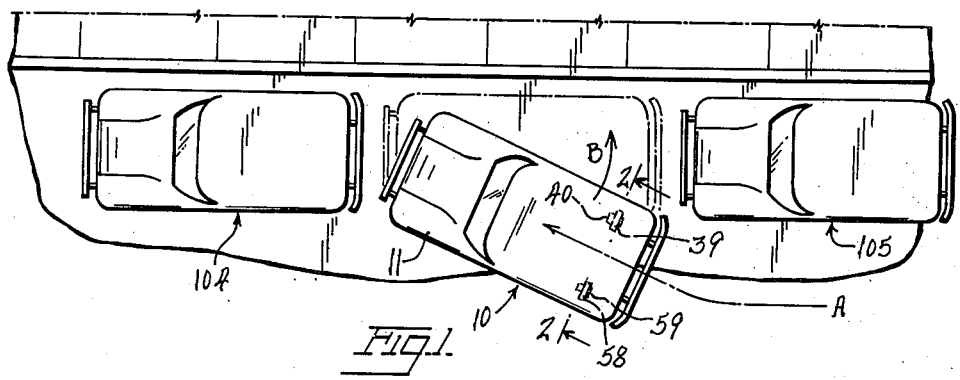
Fig. 1 is a top plan view showing the manner of parking a car having the invention incorporated therein between two other closely parked cars.

More specifically, when it is desired to park automobile 10 between the closely parked cars 104 and 105 (Fig. 1), the car 10 will be driven in the direction of the arrow A of Fig. 1 with the front portion of the car parked as indicated by means of the conventional steering wheel 101. With the car 10 in the position of Fig. 1, the knob 74 will be rotated to the "forward" position on control panel 75, operating the motor 69 and pump 64 so as to lower the portions 50 and 31 and wheels 58 and 39 until the rear of the car is jacked up and supported solely on the latter. The knob 74 will be retained in this "forward" position, until the wheels 58, 39 have been lowered the desired amount, whereupon the knob 74 will be returned to the "off" position. The gear shift rod 103 will then be put into first, and the car driven inwardly in the direction of the arrow B by stepping on the gas pedal 102, so as to bring the rear of the car against the curb. When the car has assumed the proper position parallel to the curb, the knob 74 will be turned to the "reverse" position and held there until the auxiliary wheels 58, 39 have been retracted and the car rests on the conventional wheels 14.

To unpark and drive the car away, it is only necessary to reverse the above operations.

It will be noted that the device permits the car 10 to be readily and easily parked within limited spaces which would otherwise be impossible to utilize. The device also facilitates in general the parking of the car in limited parking spaces so that anyone may properly park the car with little skill.

It is to be understood that the auxiliary wheels 58, 39 may be moved down by oil or other hydraulic pressure as well as by compressed air.

Referring now particularly to Fig. 11, there is shown a modified form of the invention wherein the conventional car generator 105 driven in the usual manner by the fan belt, not shown, is provided with an elongated shaft 106. A pulley 107 is keyed on shaft 106 and drives a one-way air pump 108 by means of belt 109. Line 110 connects the outlet of pump 108 with a reservoir 111. The reservoir 111 connects with a line 112 by means of a line 113 having a valve 114, the line 112 being connected with the cylinders 37, 48, 29 and 30 by means of branch lines 115, 116, 117 and 118, respectively. Outlet valves 119, 120, 121 and 122 are provided in cylinders 47, 48, 29 and 30, respectively. Thus, the pump 108 will build up an air pressure reserve in reservoir 111 and upon opening valve 114 and closing valves 119–122, the wheels 58 and 39 will be lowered against the action of the spring drums 41 and 60. Suitable controls for valve 114, and valves 119–122, well known to those skilled in the art, are provided below the dashboard of the car, the controls being wired so that opening the valve 114 automatically closes the valves 119–122, and vice versa.

In other respects, the form of the invention shown in Fig. 11 is the same as that shown in Figs. 1–10, and like reference numerals identify like parts throughout the several views.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a parking device for automobiles having front and rear axles with main traction wheels thereon, the combination comprising auxiliary wheels, means for rotatably mounting said auxiliary wheels at the rear of the automobile transversely of the rear main wheels thereof, means for raising and lowering said auxiliary wheels, and reversible means for driving at least one of said auxiliary wheels whereby to move the rear of the automobile in and out of parking spaces about the front wheels of the automobile as a fulcrum, said means for rotatably mounting the auxiliary wheels comprising a pair of substantially vertical, laterally aligned brackets, a horizontal shaft rotatably mounted at the bottom of each of said brackets, each of said shafts being disposed at substantially right angles to said rear axle, said rear axle having an axle housing including drive axles and a differential connecting the drive axles, said auxiliary wheels being mounted on the shafts, mounting casings connected to the axle housing on each side of said differential and extending rearwardly therefrom, a hollow upper housing mounted on each of the mounting casings, a movable bottom housing for each of said upper housings, said brackets being secured to the bottom housings, means mounting each of said bottom housings on corresponding ones of said upper housings for relative vertical movement therebetween, said reversible means for driving said auxiliary wheels comprising one of said mounting casings having an opening communicating with one of the drive axles, a first gear keyed onto said one drive axle forwardly of said opening, a pair of bearing supports secured to the axle housing, one on each side of said gear, whereby to prevent flexing of said one drive axle when said gear is in mesh, the upper portion of said upper housing adjacent said one mounting casing being hollow and communicating with said opening, a first shaft rotatably mounted within said hollow portion of said last-named upper housing and aligned horizontally with said one drive axle, a second gear on said first shaft, said first shaft having an elongated keyway and a key slidably engaged in said keyway carried by said second gear whereby said second gear is adapted to slide along said first shaft to thereby mesh with said first gear, bevel gear means connecting said first shaft with said one of said auxiliary wheels, a second shaft, means mounting said second shaft in said last-named upper housing for lateral displacement parallel to and above said first shaft, one end of said second shaft extending outwardly from the end wall of said last-named upper housing, a bifurcated member fixedly carried by said second shaft and extending downwardly therefrom, the hub portion of said second gear having an annular groove receiving said bifurcated portion, spring means sleeving said second shaft and abutting one end of said bifurcated member and adapted to urge said second gear into mesh with said first gear, and a cam fixedly carried by the bottom housing adapted to move said second shaft inwardly against the action of said spring means upon upward movement of said bottom housing associated with the last-named upper housing whereby to remove said second gear from meshing relationship with said first gear.

2. In a parking device, the combination according to claim 1, wherein said bevel gear means comprises a vertical extension in said upper housing aligned vertically with one of said auxiliary wheels, said first shaft extending into said extension, a bevel gear keyed onto said first shaft within said extension, a hollow vertical shaft rotatably mounted within said extension and extending downwardly through the bottom wall thereof, a bevel gear keyed to the top of said hollow shaft in mesh with said first bevel gear, and a vertical shaft within said hollow shaft and adapted for longitudinal movement therewithin, key means connecting said vertical and hollow shafts, a third bevel gear keyed onto the bottom of said vertical shaft and a fourth bevel gear keyed onto said shaft mounting said auxiliary wheel in mesh with said third bevel gear.

References Cited in the file of this patent
UNITED STATES PATENTS

| | | |
|---|---|---|
| 2,006,886 | Dendoff | July 2, 1935 |
| 2,058,530 | Thomas | Oct. 27, 1936 |
| 2,091,326 | Mardovin | Aug. 31, 1937 |
| 2,212,327 | Schafer | Aug. 20, 1940 |
| 2,638,995 | Gottlieb | May 19, 1953 |